US008027404B1

(12) United States Patent
Amiri et al.

(10) Patent No.: US 8,027,404 B1
(45) Date of Patent: Sep. 27, 2011

(54) LIMITING CANDIDATES FOR SYMBOL DETECTION IN A MIMO COMMUNICATION SYSTEM

(75) Inventors: Kiarash Amiri, Houston, TX (US); Raghavendar Mysore Rao, Austin, TX (US); Christopher H. Dick, San Jose, CA (US); Joseph R. Cavallaro, Pearland, TX (US)

(73) Assignee: Xilinx, Inc., San Jose, CA (US)

( * ) Notice: Subject to any disclaimer, the term of this patent is extended or adjusted under 35 U.S.C. 154(b) by 661 days.

(21) Appl. No.: 12/025,971

(22) Filed: Feb. 5, 2008

(51) Int. Cl.
*H04B 7/02* (2006.01)
(52) U.S. Cl. ............... 375/267; 375/299; 375/347
(58) Field of Classification Search .......... 375/260, 375/267, 299, 347
See application file for complete search history.

(56) References Cited

U.S. PATENT DOCUMENTS

| 7,245,666 | B1 | 7/2007 | Gardner et al. | |
|---|---|---|---|---|
| 7,529,307 | B2 | 5/2009 | Sandhu et al. | |
| 7,720,169 | B2 | 5/2010 | Reuven et al. | |
| 2006/0148506 | A1 | 7/2006 | Hoo | |
| 2006/0171483 | A1* | 8/2006 | Jia et al. | 375/267 |
| 2007/0162827 | A1 | 7/2007 | Walton et al. | |
| 2008/0089446 | A1 | 4/2008 | Lee et al. | |
| 2008/0095281 | A1 | 4/2008 | Hosur et al. | |
| 2008/0107196 | A1 | 5/2008 | Won | |
| 2008/0144746 | A1* | 6/2008 | Waters et al. | 375/340 |
| 2008/0279298 | A1 | 11/2008 | Ben-Yishai et al. | |
| 2008/0279299 | A1* | 11/2008 | Reuven et al. | 375/267 |
| 2009/0003499 | A1* | 1/2009 | Chiu et al. | 375/347 |
| 2009/0060079 | A1 | 3/2009 | Choi et al. | |
| 2009/0154600 | A1 | 6/2009 | Kim et al. | |
| 2009/0196379 | A1 | 8/2009 | Gan et al. | |

FOREIGN PATENT DOCUMENTS

WO   WO 2008/027554 A3   3/2008

OTHER PUBLICATIONS

Chin, W. H., "QRD Based Tree Search Data Detection for MIMO Communication System," *Proc. of the IEEE 61st Semiannual Vehicular Technology Conference*, May 30-Jun. 1, 2005, pp. 1624-1627, vol. 3, Stockholm, Sweden.

Detert, Thorben, "An Efficient Fixed Complexity QRD-M Algorithm for MIMO-OFDM using Per-Survivor Slicing," *Proc. of the 4th IEEE Int'l. Symposium on Wireless Communication Systems*, Oct. 16-19, 2007, pp. 572-576, Trondheim, Norway.

(Continued)

*Primary Examiner* — Kevin Kim
(74) *Attorney, Agent, or Firm* — LeRoy D. Maunu (57) ABSTRACT

A circuit detects symbols communicated between multiple transmitting antennas and multiple receiving antennas (MIMO). Distance blocks are coupled in a sequence according to an ordering of the transmitting antennas. The respective distance block associated with each transmitting antenna determines a distance value for each pairing of one or more candidates and a symbol in a constellation. A respective selector block is coupled between each successive pair of distance blocks in the sequence. The respective selector block selects the one or more candidates for the successive distance block as a limited number of the pairings having smaller ones of the distance values. A limit block coupled to the selector blocks provides the limited number to each selector block. An identifier block selects the pairing having a smaller one of the distance values from the last distance block in the sequence.

20 Claims, 6 Drawing Sheets

OTHER PUBLICATIONS

Amiri, Kiarash et al., "Novel Sort-Free Detector with Modified Real-Valued Decomposition (M-RVD) Ordering in MIMO Systems," *Proc. of the 2008 IEEE Global Telecommunications Conference*, Nov. 30, 2008, pp. 1-5, Piscataway, New Jersey, USA.

Azzam, Luay et al., "Reduced Complexity Sphere Decoding for Square QAM via a New Lattice Representation," *Proc. of the 2007 IEEE Global Telecommunications Conference*, Nov. 1, 2007, pp. 4242-4246, Piscataway, New Jersey, USA.

Azzam, Luay et al., "Reduction of ML Decoding Complexity for MIMO Sphere Decoding, QOSTBC, and OSTBC," *Proc. of the 2008 Information Theory and Applications Workshop*, Jan. 27, 2008, pp. 18-25, Piscataway, New Jersey, USA.

Chen, Sizhong et al., "Relaxed K-Best MIMO Signal Detector Design and VLSI Implementation," *IEEE Transactions on Very Large Scale Integration (VLSI) System*, Mar. 2007, pp. 328-337, vol. 15, No. 3.

Kawai, Hiroyuki et al., "Independent Adaptive Control of Surviving Symbol Replica Canditates at Each Stage Based on Minimum Branch Metric in QRM-MLD for OFCDM MIMO Multiplexing," *Proc. of the 2004 IEEE 60$^{th}$ Vehicular Technology Conference*, Sep. 26, 2004, pp. 1558-1564, vol. 3, Piscataway, New Jersey, USA.

Lin, Hsin-Lei et al., "A High-Speed SDM-MIMO Decoder Using Efficient Candidate Searching for Wireless Communication," *IEEE Transactions on Circuits and Systems—II: Express Briefs*, Mar. 2008, pp. 289-293, vol. 55, No. 3.

Mondal, Sudip, "A Novel Approach for K-Best MIMO Detection and its VLSI Implementation," *Proc. of the 2008 IEEE International Symposium on Circuits and Systems*, May 18, 2008, pp. 936-939, Piscataway, New Jersey, USA.

Myllylä, Markus et al., "Implementation Aspects of List Sphere Detector Algorithms," *Proc. of the 2007 IEEE Global Telecommunication Conference*, Nov. 1, 2007, pp. 3915-3920, Piscataway, New Jersey, USA.

Myllylä, Markus et al., "A List Sphere Detector Based on Dijkstra's Algorithm for MIMO-OFDM Systems," *Proc. of the 2007 IEEE 18$^{th}$ Annual Symposium on Personal, Indoor and Mobile Radio Communications*, Sep. 1, 2007, pp. 1-5, Piscataway, New Jersey, USA.

Wu, Yi Hsuan, "Early-Pruned K-Best Sphere Decoding Algorithm Based on Radius Constraints," *Proc. of the 2008 IEEE International Conference on Communications*, May 19, 2008, pp. 4496-4500, Piscataway, New Jersey, USA.

Huang, Liang et al.; "Better k-best Parsing"; Proceedings of the Ninth International Workshop on Parsing Technologies (IWPT); Oct. 2005; Copyright 2005 Association for Computational Linguistic; pp. 53-64.

Guo, Zhan et al.; "A Low Complexity Soft-Output MIMO Decoding Algorithm"; Advances in Wired and Wireless Communication; IEEE/Sarnoff Symposium; 2005 IEEE; pp. 90-93.

Wong, Kwan-wei et al.; "A VLSI Architecture of a K-Best Lattice Decoding Algorithm for MIMO Channels"; Circuits and Systems; 2002; ISCA 2002; IEEE International Symposium; Copyright 2002 IEEE; pp. III-273-III-276.

Damen, Mohamed Oussama et al.; "On Maximum-Likelihood Detection and the Search for the closest Lattice Point"; IEEE Transactions on Information Theory; vol. 49, No. 10; Oct. 2003; pp. 2389-2402.

Burg, Andreas et al.; "VLSI Implementation of MIMO Detection Using the Sphere Decoding Algorithm"; IEEE Journal of Solid-State Circuits; vol. 40, No. 7; Jul. 2005; Copyright 2005 IEEE; pp. 1566-1577.

Amiri, Kiarash et al.; "FPGA Implementation of Dynamic Threshold Sphere Detection for MIMO Systems"; 40th Asilomar Conference on Signals, Systems, and Computers; Nov. 2006; pp. 94-98.

Guo, Zhan et al.; A 53.3 Mb/s 4×4 16-QAM MIMO Decoder in 0.35-µm CMOS; IEEE International Symposium on Circuits and Systems; vol. 5; Copyright 2005 IEEE; May 2005; pp. 4947-4950.

Bengough, Peter A. et al.; "Sorting-Based VLSI Architectures for the $M$-Algorithm and $T$-Algorithm Trellis Decoders"; Copyright 1995 IEEE; IEEE Transactions on Communications, vol. 43, No. 2/3/4, Feb. / Mar./ Apr. 1995; pp. 514-522.

Xilinx, Inc.; U.S. Appl. No. 12/170,468; by Kiarash Amiri et al.; filed Jul. 10, 2008.

Xilinx, Inc.; U.S. Appl. No. 12/045,786; by Kiarash Amiri et al.; filed Mar. 11, 2008.

Xilinx, Inc.; U.S. Appl. No. 12/170,474; by Kiarash Amiri et al.; filed Jul. 10, 2008.

Xilinx, Inc.; U.S. Appl. No. 12/193,106; by Christopher H. Dick et al.; filed Aug. 18, 2008.

\* cited by examiner

LIMITING CANDIDATES FOR SYMBOL DETECTION IN A MIMO COMMUNICATION SYSTEM

FIELD OF THE INVENTION

The present invention generally relates to communication to multiple input antennas from multiple output (MIMO) antennas, and more particularly to symbol detection for a MIMO communication system.

BACKGROUND

Data can be transmitted electromagnetically between a transmitting and a receiving antenna. The transmitter encodes the data into a sequence of symbols selected from a symbol constellation. The transmitting antenna transmits the symbols and the receiving antenna detects the symbols.

Interference from noise and reflections corrupts the symbols received by the receiving antenna. For a maximum-likelihood detector, the receiver can compare the received signal with the expected received signal for all of the symbols in the constellation. The expected received signal that most closely matches the actually received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate of electromagnetic communication increases by transmitting multiple symbols in parallel from multiple transmitting antennas. The detection of the multiple transmitted symbols improves by receiving the symbols with multiple receiving antennas.

For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The present invention may address one or more of the above issues.

SUMMARY

Various embodiments of the invention provide a circuit for detecting symbols communicated between multiple transmitting antennas and multiple receiving antennas (MIMO). Distance blocks are associated with the transmitting antennas and are coupled in a sequence according to an ordering of the transmitting antennas. The respective distance block associated with each transmitting antenna determines a distance value for each pairing of one or more candidates and a symbol in a constellation. A respective selector block is coupled between each successive pair of distance blocks in the sequence. The respective selector block selects the one or more candidates for the successive distance block as a limited number of the pairings having smaller ones of the distance values. A limit block coupled to the selector blocks provides the limited number to each selector block. An identifier block is coupled to a last one of the distance blocks in the sequence and selects the pairing having a smaller one of the distance values from the last distance block.

Various other embodiments of the invention provide a program storage medium of a processor-readable device configured with instructions. Execution of the instructions by one or more processors causes the one or more processors to generate configuration data for a programmable logic device. The configuration data implements distance blocks, selector blocks, a limit block, and an identifier block in the programmable logic device.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
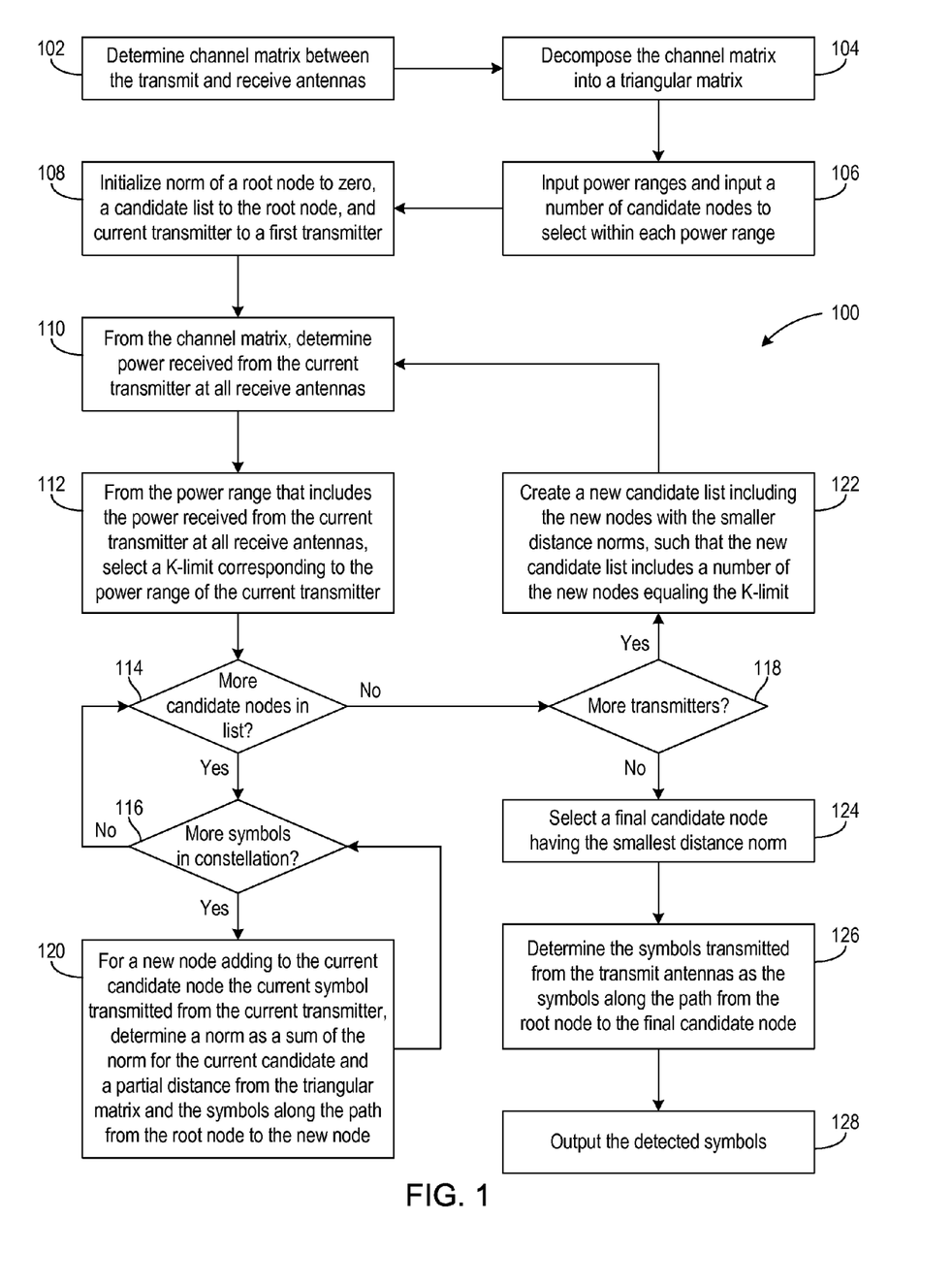
FIG. 1 is a flow diagram of a process for detecting symbols received at multiple input antennas and transmitted from multiple output antennas in accordance with various embodiments of the invention.

FIG. 1 is a flow diagram of a process 100 for detecting symbols received at multiple input antennas and transmitted from multiple output antennas (MIMO) in accordance with various embodiments of the invention. While a maximum-likelihood detector detects the transmitted symbols by considering all combinations of each transmitting antenna transmitting every possible symbol in a constellation, process 100 considers a subset of all of these combinations.

At step 102, a channel matrix is determined for the communication channel between the transmitting and receiving antennas. A model for the communication channel is:

$$y = Hs + n$$

where H is an N×M channel matrix between the N receiving antennas and the M transmitting antennas, s is a column vector of M symbols transmitted from the transmitting antennas, n is a column vector of N received noise elements, and y is a column vector of N signals received at the receiving antennas. Each of the M transmitted symbols in column vector s is a symbol from a constellation having an order of w symbols.

At step 104, process 100 decomposes the channel matrix into a triangular matrix. In one embodiment, the triangular matrix is an upper triangular matrix from a QR decomposition of the channel matrix. The detection of the transmitted symbols includes determining the M symbols in column vector s that minimize the distance norm:

$$D(s) = \|y - Hs\|^2 = \|Q^H y - Rs\|^2 = \sum_{i=M}^{1} \left| y'_i - \sum_{j=i}^{M} R_{ij} s_j \right|^2$$

where H=QR, $QQ^H$=I, and y'=$Q^H$y. The summations derive from R being an upper triangular matrix. The outer summation from i=M down to 1 is a summation of a corresponding term for each of the transmitting antennas beginning from the last antenna. The corresponding term of the outer summation for each transmitting antenna is denoted the partial distance for the transmitting antenna. The partial distance for a particular transmitting antenna with index i includes an inner summation of a weighting of the candidate symbols from transmitting antennas i to M. Thus, the QR decomposition permits calculating the distance norm D(s) for candidate symbols s by summing a partial distance for each index of a transmitting antenna, and the partial distance for each index is a function of the symbols having the same and larger indices.

The receiver detects the transmitted symbols by computing the distance norm for various combinations selected from all combinations of M symbols in the constellation. The M symbols actually transmitted from the M transmitting antennas should match the combination that has the smallest value of the distance norm.

Process 100 chooses the symbols of a particular candidate by sequentially selecting a symbol for each transmitting antenna, and process 100 calculates the partial distance for each selected symbol from the selected symbol and the previously selected symbols of the particular candidate. The cumulative sum of these partial distances for the already selected symbols is a partial norm of the particular candidate. For two candidates with the same number of selected symbols, the candidate with the lesser partial norm is more likely to correspond to the actually transmitted symbols.

At step 106, a set of power ranges is input along with a limit on the number of detection candidates to consider for each power range. The power received from each transmitting antenna determines the number of detection candidates for that antenna. In one embodiment, the power received at all receiving antennas from the transmitting antenna with index i is:

$$g_i = \sum_{j=1}^{N} |h_{ji}|^2$$

and this received power is a sum of squares of the elements in a column of the channel matrix.

In one embodiment, a sorted series of power thresholds P={$p_1$, $p_2$, . . . $p_F$} specify the power ranges {<$p_1$, $p_1$<$p_2$, . . . , $p_{F-1}$<$p_F$, >$p_F$} that have corresponding candidate limits K={$k_0$, $k_1$, $k_2$, . . . $k_F$}. The power range that includes the power received from a specific transmitting antenna determines the limit on the number of candidates for that transmitting antenna.

Figure 2:
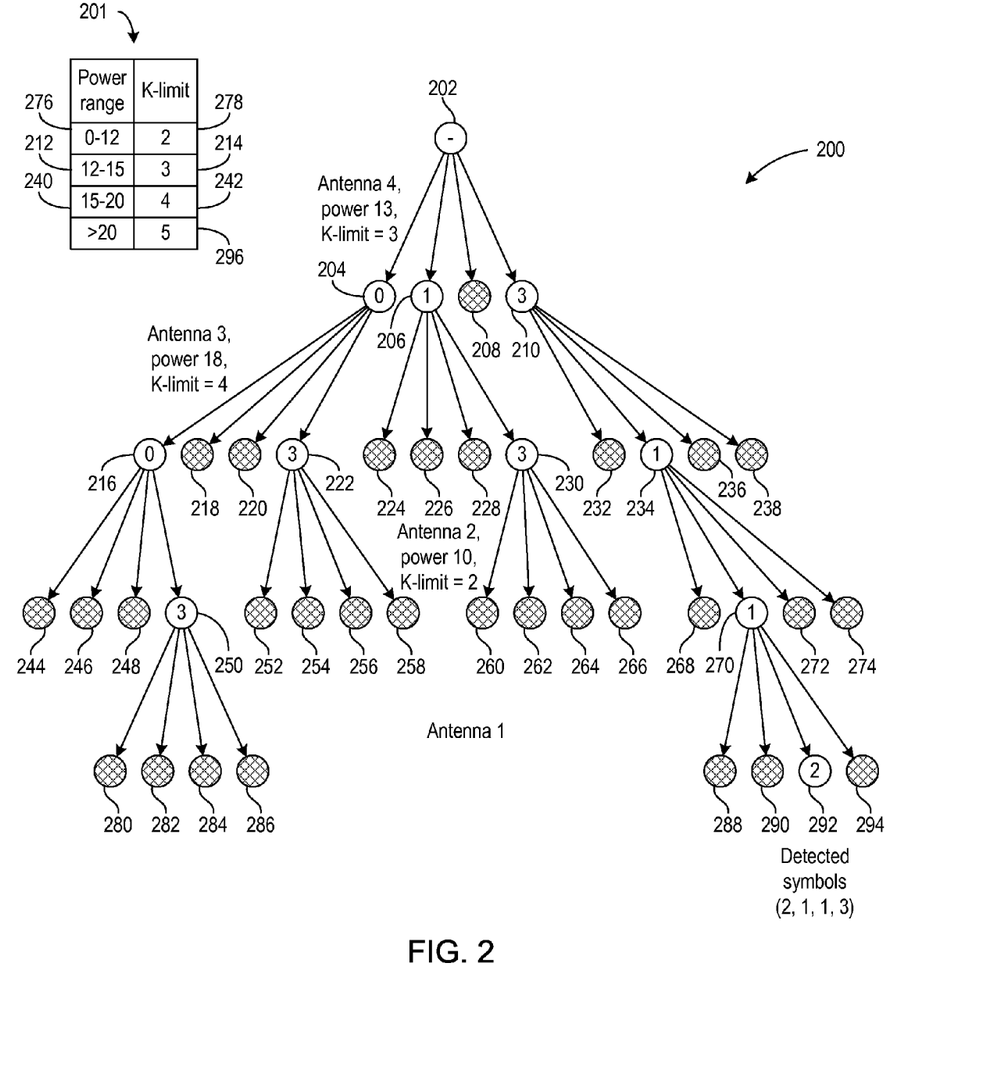
FIG. 2 is a graph diagram of an example tree illustrating a process of selecting candidates for detecting symbols communicated between multiple transmitting and receiving antennas in accordance with various embodiments of the invention.

Now refer to FIG. 2 before completing the discussion of FIG. 1. FIG. 2 is a graph diagram of an example tree 200 illustrating a process of selecting candidates for detecting symbols communicated between multiple transmitting and receiving antennas in accordance with various embodiments of the invention. The example tree 200 has a level for each of four transmitting antennas transmitting one of four symbols in a constellation.

The example tree 200 has a root node 202 representing a null candidate with zero selected symbols. The first level of nodes 204, 206, 208, and 210 respectively represent antenna-4 transmitting a 0-symbol, a 1-symbol, a 2-symbol, and a 3-symbol in the constellation. For each of nodes 204, 206, 208, and 210, a partial distance is calculated. For the first level, this partial distance for each node 204, 206, 208, or 210 is a partial norm that provides a relative likelihood that the corresponding symbol was actually transmitted by transmitting antenna-4.

Also calculated for antenna-4 is the power received from antenna-4 at all receiving antennas. In this example, the power received from transmitting antenna-4 is 13 units. Because 13 units is within power range 212, corresponding limit 214 is selected to limit the number of candidates for antenna-4 to three candidates. The partial norms of nodes 204, 206, 208, and 210 are compared to select the three candidate nodes 204, 206, and 210 that have the smaller partial norms. These candidate nodes are labeled with the corresponding symbol names and eliminated node 208 is shown shaded.

The selected candidate nodes 204, 206, and 210 are expanded in the second level to add antenna-3 transmitting each possible symbol in the constellation. Candidate node 204 is expanded to include, for example, candidate node 216 representing both antenna-4 and antenna-3 transmitting symbol-0. Partial distances are calculated for each of nodes 216 through 238, and these partial distances are added to the partial norms of corresponding candidate nodes 204, 206, and 210 to give a partial norm for nodes 216 through 238. The partial norms for nodes 216 through 238 provide a relative likelihood that antenna-4 and antenna-3 actually transmitted the corresponding symbols.

The power received from antenna-3 is determined to be 18 units, and power range 240 encompasses the value of 18 units, such that the candidate limit 242 is four. The partial norms of nodes 216 through 238 are compared to select the four candidate nodes 216, 222, 230, and 234 having the smaller partial norms.

At the next level for antenna-2, the four candidate nodes 216, 222, 230, and 234 are expanded and corresponding partial norms are calculated for nodes 244 through 274. Because the total power received from antenna-2 is 10 units, power range 276 provides the limit 278 of two candidates for antenna-2. The partial norms of nodes 244 through 274 are compared to select the two candidate nodes 250 and 270 having the smaller partial norms.

The last level for antenna-1 expands the candidate nodes 250 and 270 and calculates partial norms for nodes 280 through 294. Because this is the last level, the calculated partial norms are complete distance norms. Because node 292 has the smallest distance norm, node 292 is selected as the final candidate representing the detection that antenna-1 transmitted symbol-2, antenna-2 and antenna-3 transmitted symbol-1, and antenna-4 transmitted symbol-3. It will be appreciated that it is not necessary for the last level to determine the candidate limit from the power range including the total power received from antenna-1.

Example tree 200 includes a total of 41 nodes, 202 through 210, 216 through 238, 244 through 274, and 280 through 294. For maximum-likelihood detection, a corresponding tree includes a total of 341 nodes. The search of tree 200 provides increased efficiency by pruning the nodes that are unlikely to correspond to the actually transmitted symbols.

Referring back to FIG. 1, step 108 initializes the root node with a partial norm of zero, initializes the candidate list to the root node, and sets the current transmitter to a first transmitting antenna in an ordering of the transmitting antennas.

At step 110, the power received from the current transmitter is determined from the channel matrix. At step 112, the received power from the current transmitter is matched with a power range to select a K-limit associated with the power range.

Decision 114 checks whether the candidate list includes more nodes. If there are more nodes in the candidate list, process 100 proceeds to decision 116; otherwise, process 100 proceeds to decision 118. Decision 116 checks whether the constellation includes additional symbols. If there is another symbol in the constellation for the current candidate from the list, process 100 proceeds to step 120; otherwise, process 100 returns to decision 114 to process the next candidate in the list.

At step 120, a partial norm is determined for a new pairing of the current candidate and the current symbol. The partial norm gives a relative likelihood that the current transmitter transmitted the current symbol along with corresponding transmitters transmitting the symbols of the current candidate. The partial norm of the new pairing is a sum of the partial norm of the current candidate and a partial distance of the current symbol. The partial distance of the current symbol is calculated from the signals received at the receiving antennas, the triangular decomposition of the channel matrix, the symbols of the current candidate, and the current symbol.

Decision 118 checks whether the current transmitter is the last transmitter. If there are more transmitters, process 100 proceeds to step 122; otherwise, process 100 proceeds to step 124. At step 122, a new candidate list is created that includes the nodes from step 120 that have the smallest values of the partial norms. Process 100 iterates, with this new candidate list replacing the previous candidate list.

At step 124, a final candidate node is selected that has the smallest norm. The final candidate provides the detected symbols as the symbols included in the final candidate along the path from the root node to the final candidate node. These symbols are detected as transmitted from the transmitting antennas at step 126. The detected symbols are output at step 128.

Figure 3:
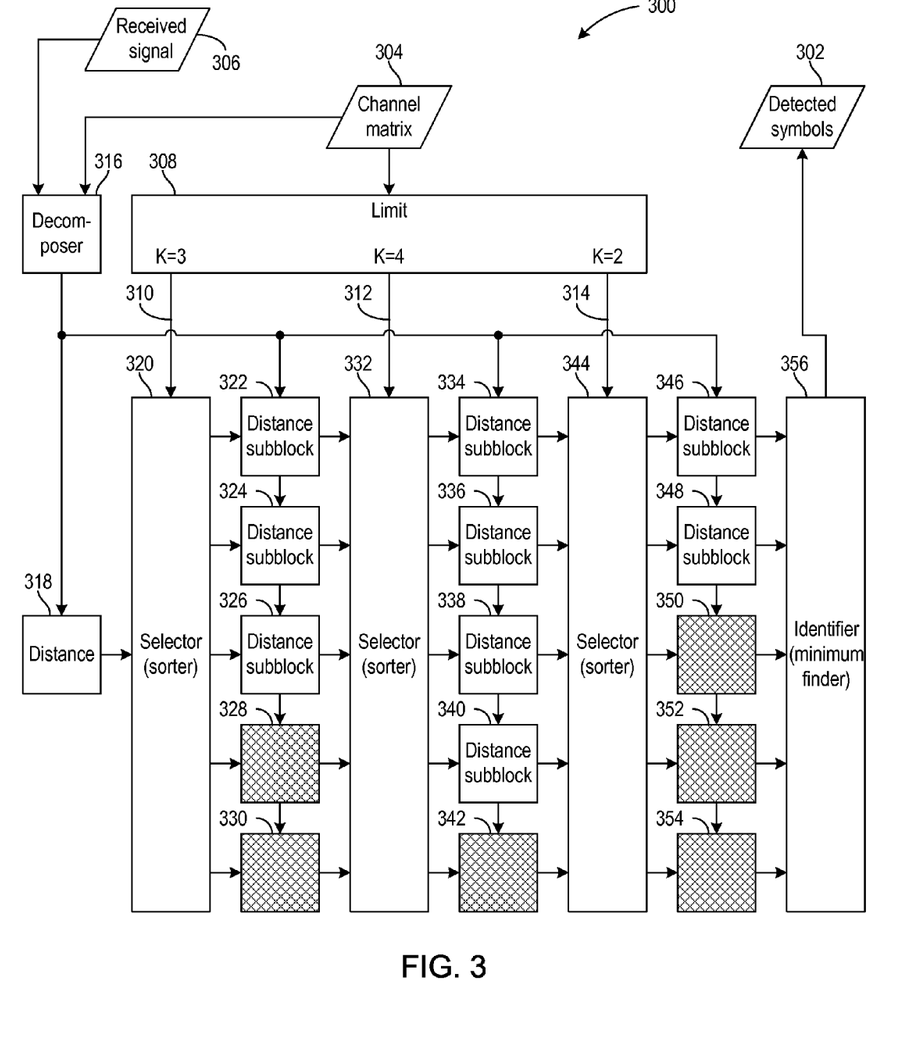
FIG. 3 is a block diagram of a circuit for low-power detection of symbols communicated from multiple transmitting antennas to multiple receiving antennas in accordance with various embodiments of the invention.

FIG. 3 is a block diagram of a circuit 300 for low-power detection of symbols communicated from multiple transmitting antennas to multiple receiving antennas in accordance with various embodiments of the invention. Circuit 300 produces detected symbols 302 from channel matrix 304 and received signals 306.

A limit block 308 generates values of various limits on the number of candidates. In one embodiment, limit block 308 determines the total power received from each transmitting antenna using the channel matrix 304, and each limit value is associated with a power range that includes the total power received at a transmitting antenna. For the example symbol detection of FIG. 2, limit block 308 provides a limit value of three candidates on line 310 for transmitting antenna-4, a limit value of four candidates on line 312 for transmitting antenna-3, and a limit value of two candidates on line 314 for transmitting antenna-2. Limit block 308 does not determine a limit value for transmitting antenna-1 in this embodiment.

Decomposer 316 transforms the channel matrix 304 into a triangular matrix using a QR decomposition, for example. Decomposer 316 also transforms the received signal 306 according to the decomposition of the channel matrix 304.

Distance block 318 determines partial distances for a first transmitting antenna transmitting each symbol in a constellation. For this first transmitting antenna, the partial distances are also partial norms giving a relative likelihood of the first transmitting antenna transmitting each of the symbols in the constellation. For an example of a constellation that has an order of w symbols, distance block 318 provides w partial norms to selector 320. In one embodiment, distance block 318 determines a partial distance for each pairing of a null candidate and each symbol in a constellation.

Selector 320 selects the smaller of the w partial norms. In one embodiment, selector 320 sorts the w partial norms in ascending order and selects from the beginning of the ascending order a number of smallest partial norms matching the limit value on line 310 from limit block 308. For example, selector 320 selects the three smallest of the w partial norms when the limit value on line 310 is three.

In one embodiment, the limit values on lines 310, 312, and 314 are higher when the received power from the corresponding antennas is high, and lower when the received power from the corresponding antennas is low. When the received power from a transmitting antenna is high, the received signal may have a higher signal-to-noise ratio, such that signal detection improves from increased processing of the signal received from this transmitting antenna. Conversely, less processing of the received signal is appropriate when the received signal has poor quality, because the power received from a transmitting antenna is low.

Various embodiments of the invention limit the number of candidates for a transmitting antenna based on the power received from the transmitting antenna. As conditions change, such as fading in the communication channel and/or movement of the transmitting and/or receiving antennas, the power received from each transmitting antenna can change. The candidate limit can change dynamically as communication conditions change. The value of the candidate limit generally has a maximum value; for example, the maximum value is five for candidate limit 296 in FIG. 2. This maximum value can be predetermined to reduce the amount of circuitry in circuit 300.

Selector 320 selects a limited number of candidates having the smaller partial norms from distance block 318. The limited number varies dynamically, but is always less than a specific value of, for example, five candidates. Each of the up to five candidates is sent to respective distance subblocks 322, 324, 326, 328, and 330. Collectively, distance subblocks 322, 324, 326, 328, and 330 form a distance block for a second transmitting antenna. Each distance subblock 322, 324, 326, 328, and 330 has a function similar to distance block 318. For example, distance subblock 322 determines partial norms for the second transmitting antenna transmitting each symbol in a constellation along with the first transmitting antenna transmitting the candidate symbol selected by selector 320 for distance subblock 322. Distance subblock 322 calculates the partial norm for each symbol in the constellation as the sum of the partial norm of the candidate from selector 320 and a partial distance for the second transmitting antenna transmitting the symbol.

In one embodiment, circuit 300 puts unused distance subblocks into a low-power mode to save power. For example, distance subblocks 328 and 330 are put into low-power mode when the limit value on line 310 is three, because then selector 320 provides three candidates to the active distance subblocks 322, 324, and 326.

The w partial norms from each active distance subblock 322, 324, 326, 328, or 330 are sent to selector 332, which selects a limited number of candidates having the smaller partial norms for the third transmitting antenna. In this example, the limit value on line 312 is four, such that selector 332 selects the four smallest distance norms and provides these norms and the corresponding candidates to activated distance subblocks 334, 336, 338, and 340. Distance subblock 342 is put into a low-power mode.

Similarly, active distance subblocks 346 and 348 calculate w distance norms for both candidates selected by selector 344, and distance subblocks 350, 352, and 354 are inactivated. The distance norms distance from subblocks 346 and 348 (and distance subblocks 350, 352, and 354 when activated) for the last transmitting antenna are complete distance norms instead of partial distance norms.

Identifier 356 selects the final candidate having the smallest distance norm from the w partial norms from each of the distance subblocks 346, 348, 350, 352, and 354 that are activated. The final candidate corresponds to the selection of a corresponding symbol for each transmitting antenna and these symbols for the transmitting antennas are the detected symbols 302.

In one embodiment, limit block 308 provides means for selecting a respective limit number for each transmitting antenna in response to a total power received at the receiving antennas from the transmitting antenna. Distance block 318 and distance subblocks 322 through 330, 334 through 342, and 346 through 354 provide means for determining a distance for each pairing of one or more candidates for each transmitting antenna and a symbol in a constellation. Selectors 320, 322, and 344 provide means for selecting the one or more candidates for a next transmitting antenna following each transmitting antenna in the ordering as a subset of the pairings that have smaller values of the distances for the transmitting antenna. Identifier 356 provides means for selecting a final candidate as the pairing that has a smaller value of the distances for a last transmitting antenna in the ordering.

Figure 4:
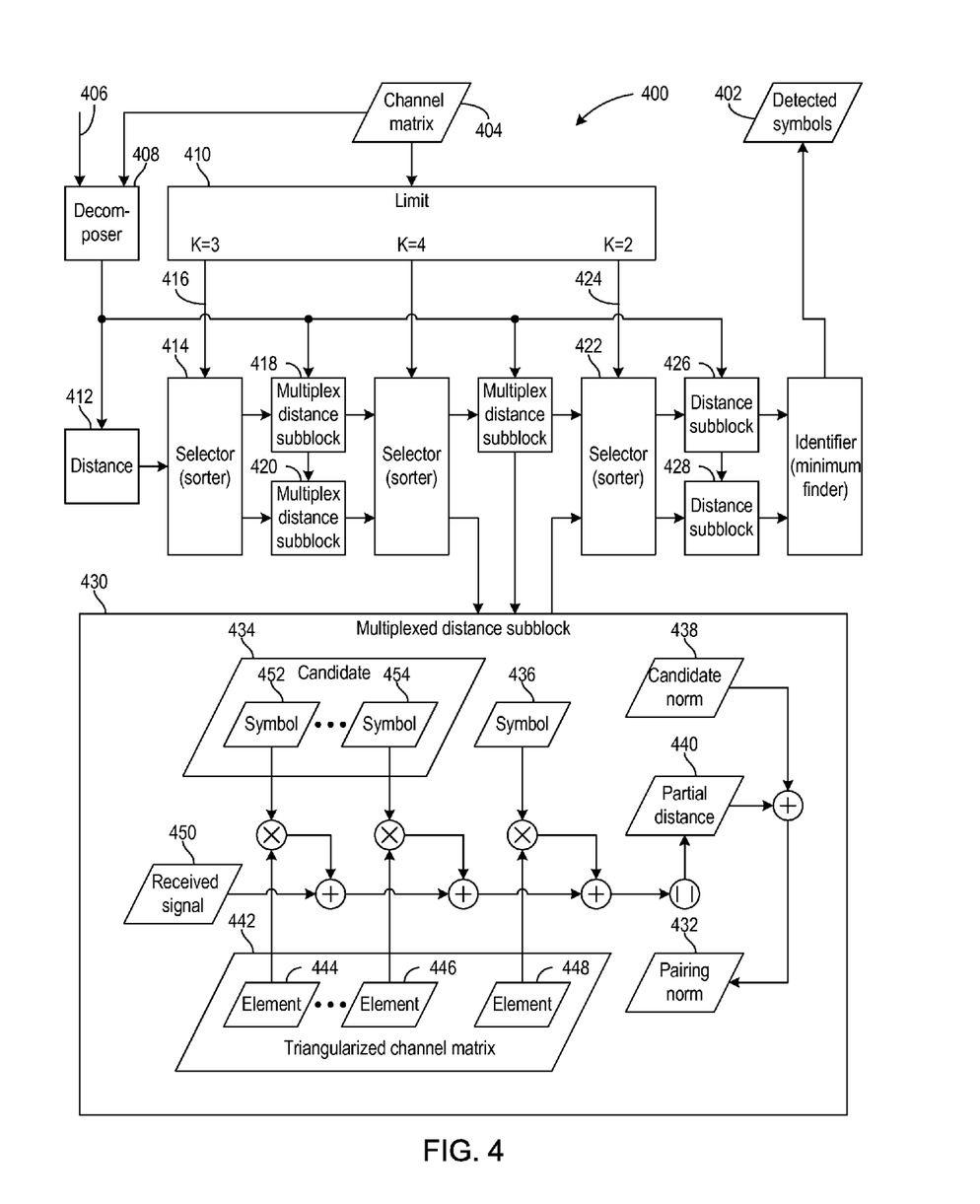
FIG. 4 is a block diagram of a circuit for time-multiplexing detection of symbols communicated from multiple transmitting antennas to multiple receiving antennas in accordance with various embodiments of the invention.

FIG. 4 is a block diagram of a circuit 400 for time-multiplexing detection of symbols communicated from multiple transmitting antennas to multiple receiving antennas in accordance with various embodiments of the invention. Circuit 400 produces detected symbols 402 from channel matrix 404 and the received signals on line 406.

Decomposer 408 decomposes the channel matrix 404 into a triangular matrix and correspondingly transforms the received signal on line 406. Limit block 410 determines a limit on the number of candidates for all of the transmitting antennas except for a last transmitting antenna. In one embodiment, the values of the candidate limits vary within a predetermined range depending on the power currently received from the transmitting antennas.

Distance block 412 calculates a partial norm for a first transmitting antenna and selector 414 selects a number of candidates having the smaller distance norms with the number of candidates provided on line 416 from limit block 410. Selector 414 provides the candidates to multiplexed distance subblocks 418 through 420 for the second transmitting antenna.

In one embodiment, the number of multiplexed distance subblocks 418 through 420 corresponds to a minimum of the predetermined range for the candidate limits. Referring back to the example of FIG. 2, the candidate limits 278, 214, 242, and 296 have respective values of two, three, four, and five within the predetermined range of two for limit 278 and five for limit 296. Thus, the number of distance subblocks 418 through 420 equals two for the minimum of the predetermined range. It will be appreciated that in alternative embodiments, the number of distance subblocks 418 through 420 can be less than or greater than the minimum of the predetermined range.

If the value of the candidate limit on line 416 is more than the number of the distance subblocks 418 through 420, then circuit 400 time multiplexes the operation of distance subblocks 418 through 420 to calculate the partial norms for all of the candidates selected by selector 414. The time multiplexing has a number of time slices given by the ratio of the candidate limit on line 416 to the number of multiplexed distance subblocks 418 through 420. It will be appreciated that the number of time slices rounds up this ratio to an integer if the ratio is a non-integer. Furthermore, when the ratio is a non-integer not all of the distance subblocks 418 through 420 are active in all time slices, such that some of distance subblocks 418 through 420 can be put into a low-power mode in certain time slices.

If the value of a candidate limit is equal to the minimum of the predetermined range, distance subblocks can compute partial distances without multiplexing. For example, selector 422 selects two candidates as determined by the limit value on line 424 from the limit block 410. Distance subblocks 426 and 428 can determine a set of partial norms for these two candidates in a single time slice.

Multiplexed distance subblock 430 determines a distance norm 432 for the pairing of a candidate 434 and each possible symbol 436 in a constellation. For clarity, FIG. 4 shows the calculation of the pairing norm 432 for only one symbol 436 in the constellation. The distance norm 432 for the pairing is a sum of a previously determined distance norm 438 for the candidate 434 and a partial distance 440 for the pairing of the candidate 434 and the symbol 436.

The channel matrix 404 is transformed into a triangular matrix 442 with a row of elements 444, 446, through 448 for the transmitting antenna that corresponds to the multiplexed distance subblock 430. During the transformation of the channel matrix into a triangular matrix, the received signal on line 406 from this transmitting antenna is correspondingly transformed into the received signal 450. The partial distance 440 is a norm of a sum of the transformed received signal 450 and a weighted sum of the symbols 452, 454, and 436. The symbols 452 through 454 from candidate 434 and the symbol 436 from the constellation have a weight given by the row of elements 444, 446, through 448 in the triangular matrix.

If selector 422 selects the distance norm 432, the new candidate is the pairing of the candidate 434 and the symbol 436. This new candidate recursively includes symbols 436 and 452 through 454.

Figure 5:
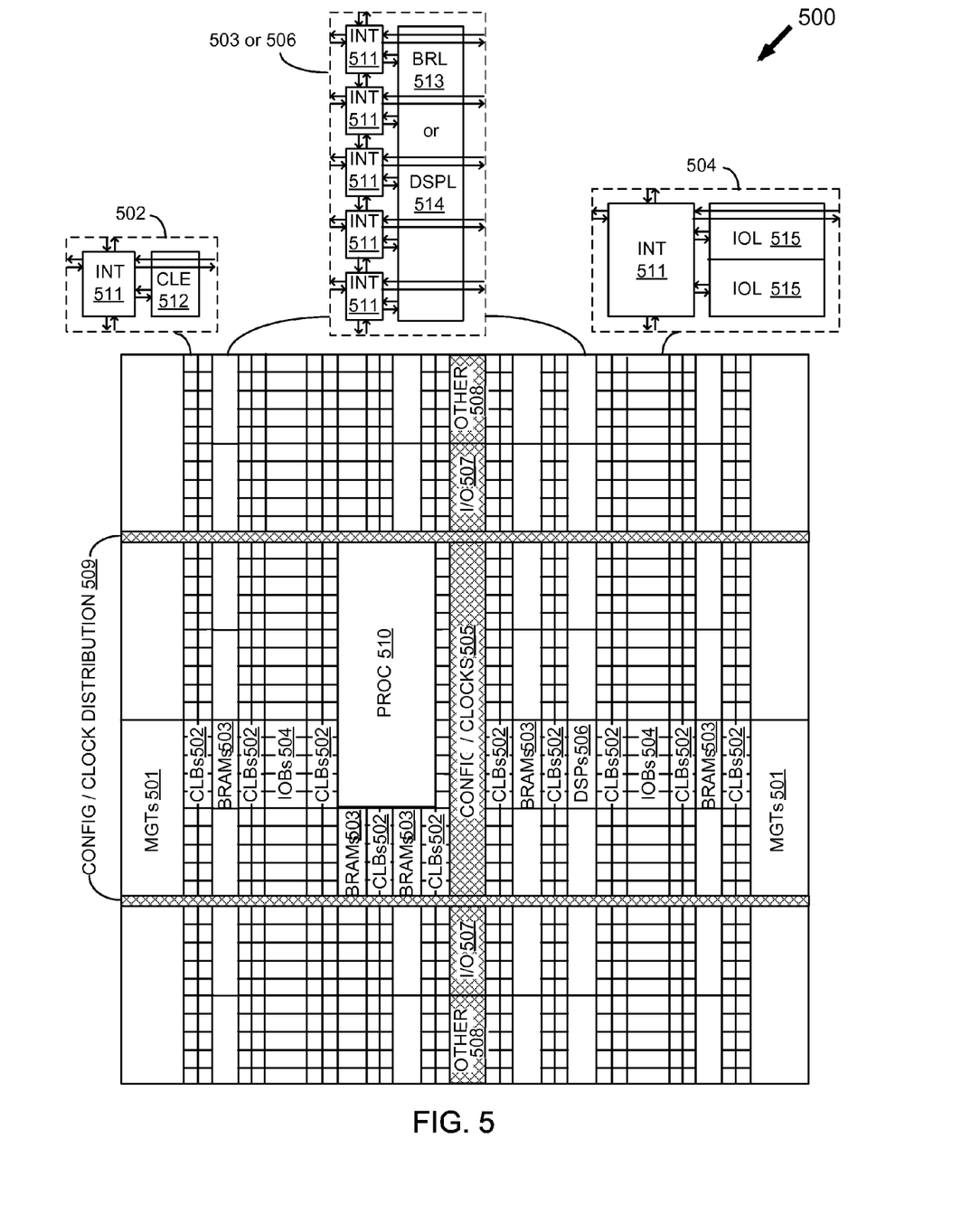
FIG. 5 is a block diagram of an exemplary programmable logic device for implementing symbol detection in accordance with one or more embodiments of the invention.

FIG. 5 is a block diagram of a programmable logic device that can be used for implementing symbol detection in accordance with one or more embodiments of the invention.

Advanced programmable logic devices can include several different types of programmable logic blocks in the array. For example, FIG. 5 illustrates a field programmable gate array (FPGA) architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 6:
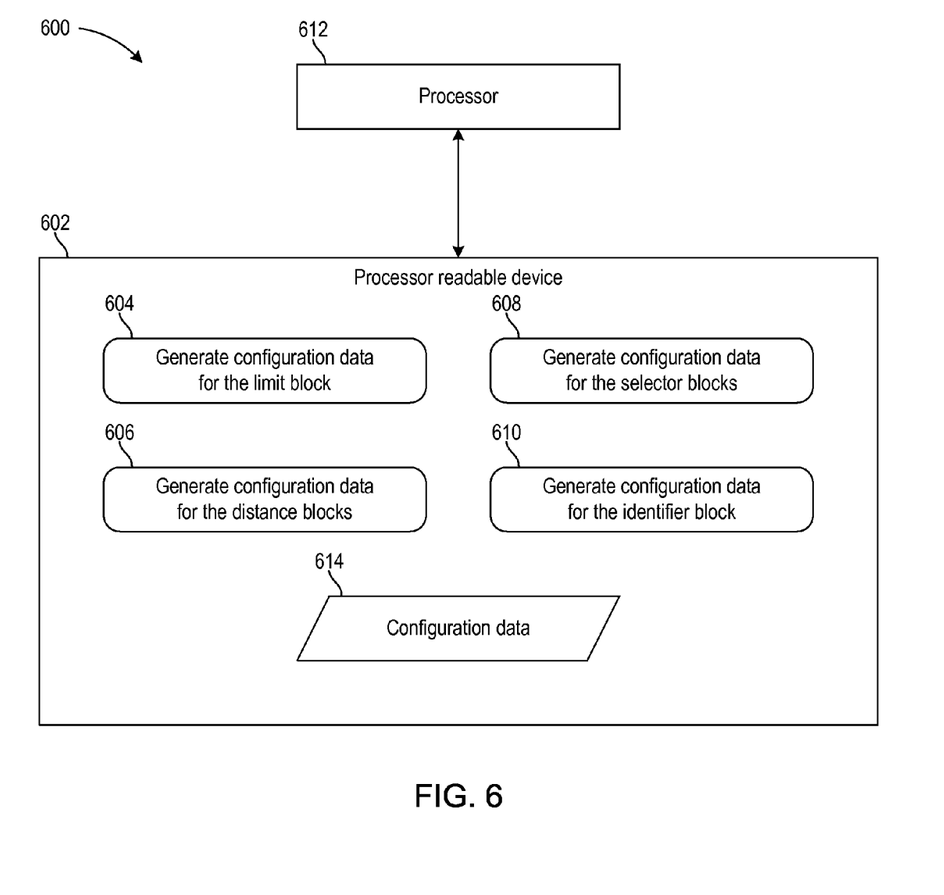
FIG. 6 is a block diagram of a system for generating configuration data for implementing symbol detection in a programmable logic device in accordance with one or more embodiments of the invention.

FIG. 6 is a block diagram of a system 600 for generating configuration data for implementing symbol detection in a programmable logic device in accordance with one or more embodiments of the invention. Processor-readable device 602 is configured with software modules 604, 606, 608, and 610. Execution of the instructions of software modules 604, 606, 608, and 610 by processor 612 causes processor 612 to generate configuration data that implements MIMO symbol detection in a programmable logic device. In one embodiment, the generated configuration data 614 is stored on the processor readable device 602.

Execution of the instructions of software module 604 causes processor 612 to generate configuration data that implements a limit block in the programmable logic device. Execution of the instructions of software modules 606 causes processor 612 to generate configuration data for the distance blocks. Execution of the instructions of software module 608 causes processor 612 to generate configuration data for the selector blocks. Execution of the instructions of software module 610 causes processor 612 to generate configuration data for an identifier block.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for detecting symbols communicated between multiple transmitting antennas and multiple receiving antennas. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for detecting symbols communicated between multiple transmitting antennas and multiple receiving antennas, comprising:

means for selecting a respective limit number for each transmitting antenna in response to a total power received at the receiving antennas from the transmitting antenna;

for each transmitting antenna in an ordering of the transmitting antennas, means for determining a distance for each pairing of at least one candidate for the transmitting antenna and one of a plurality of symbols in a constellation, wherein the at least one candidate for a first transmitting antenna in the ordering is a null candidate;

means for selecting the at least one candidate for a next transmitting antenna following each transmitting antenna in the ordering as a subset of the pairings that have smaller values of the distances for the transmitting antenna, wherein a size of the subset is limited to the respective limit number for the transmitting antenna; and means for selecting a final candidate as the pairing that has a smaller value of the distances for a last transmitting antenna in the ordering, wherein the final candidate includes the symbols detected as transmitted by the transmitting antennas.

2. A circuit for detecting symbols communicated between multiple transmitting antennas and multiple receiving antennas, comprising:

respective distance blocks associated with the transmitting antennas and coupled in a sequence according to an ordering of the transmitting antennas, wherein the respective distance block associated with each transmitting antenna determines a distance value for each of a first plurality of pairings, each pairing being one of one or more candidates and one of a plurality of symbols in a constellation;

a respective selector block coupled between each successive first and second one of the distance blocks in the sequence, the respective selector block configured to select a second plurality of candidates for the second distance block from the first plurality of pairings of the first distance block, wherein the second plurality of candidates is a limited number of the first plurality of pairings having smaller ones of the distance values;

a limit block coupled to each selector block, wherein the limit block provides the limited number to each selector block; and an identifier block coupled to a last one of the distance blocks in the sequence, wherein the identifier block selects the pairing having a smaller one of the distance values from the first plurality of pairings of the last distance block.

3. The circuit of claim 2, wherein each of the distance blocks other than an initial one of the distance blocks in the sequence include a number of sub-blocks equaling a maximum of a plurality of permitted values of the limited number of each selector block, each of the sub-blocks determining the distance value for each pairing of one candidate and the symbols in the constellation, and in response to the maximum exceeding the limited number of the distance block, the distance block puts into a low-power mode a number of the sub-blocks equaling a difference between the maximum number and the limited number.

4. The circuit of claim 2, wherein each of the distance blocks other than an initial one of the distance blocks in the sequence includes a predetermined number of sub-blocks, each of the sub-blocks determining the distance value for each pairing of one candidate and the symbols in the constellation, and in response to the predetermined number being exceeded by the limited number of the distance block, the distance block time-multiplexes the determining of the distances values by the sub-blocks.

5. The circuit of claim 2, wherein each of the distance blocks other than an initial one of the distance blocks in the sequence includes a number of sub-blocks equaling a minimum of a plurality of permitted values of the limited number of each selector block, each of the sub-blocks determining the distance value for each pairing of one candidate and the symbols in the constellation, and in response to the minimum being exceeded by the limited number of the distance block, the distance block time-multiplexes the determining of the distances values by the sub-blocks.

6. The circuit of claim 2, wherein an initial one of the distance blocks in the sequence determines the distance value of the initial distance block for each pairing of a null candidate and a symbol in the constellation.

7. The circuit of claim 2, wherein the respective distance block associated with each transmitting antenna determines the distance value for each pairing of a candidate and a symbol as a sum of the distance value of the pairing for the candidate and a partial distance value for the symbol.

8. The circuit of claim 2, wherein the respective distance block associated with each transmitting antenna determines the distance value for each pairing of a candidate and a symbol from a partial distance value for the symbol calculated as a function of the symbol and the symbols recursively included in the candidate.

9. The circuit of claim 2, wherein the respective selector block sorts the distance values from the first distance block in ascending order and selects the second plurality of candidates for the second distance block as the limited number of the first plurality of pairings having the distance values at a beginning of the ascending order.

10. The circuit of claim 2, wherein the respective selector block selects the second plurality of candidates for the second distance block as the limited number of the first plurality of pairings having smallest ones of the distance values from the first distance block, and the identifier block selects the pairing having the smallest one of the distance values from the first plurality of pairings of the last distance block.

11. The circuit of claim 2, wherein the limit block is adapted to provide two different ones of a plurality of permitted values of the limited number to corresponding ones of the selector blocks.

12. The circuit of claim 2, wherein the limit block provides the limited number to each selector block in response to a channel matrix for the transmitting and receiving antennas.

13. The circuit of claim 2, wherein the limit block provides the limited number to the respective selector block coupled between the successive first and second distance blocks in response to a total power received at the receiving antennas from the transmitting antenna associated with the first distance block.

14. The circuit of claim 2, wherein the limit block includes a plurality of power ranges each having an associated integer provided as the limited number to the respective selector block coupled between the successive first and second distance blocks in response to the power range encompassing a total power received from the transmitting antenna associated with the first distance block.

15. The circuit of claim 2, wherein the identifier block selects the pairing and the pairing recursively includes, for each transmitting antenna, a respective one of the symbols that is detected as transmitted from the transmitting antenna.

16. A program storage medium, comprising:
a processor-readable device configured with instructions, wherein execution of the instructions by one or more processors causes the one or more processors to perform operations including generating configuration data for a programmable logic device that implements,
respective distance blocks associated with the transmitting antennas and coupled in a sequence according to an ordering of the transmitting antennas, wherein the respective distance block associated with each transmitting antenna determines a distance value for each of a first plurality of pairings, each pairing being one of one or more candidates and one of a plurality of symbols in a constellation;
a respective selector block coupled between each successive first and second one of the distance blocks in the sequence, the respective selector block configured to select a second plurality of candidates for the second distance block from the first plurality of pairings of the first distance block, wherein the second plurality of candidates is a limited number of the first plurality of pairings having smaller ones of the distance values;
a limit block coupled to each selector block, wherein the limit block provides the limited number to each selector block; and
an identifier block coupled to a last one of the distance blocks in the sequence, wherein the identifier block selects the pairing having a smaller one of the distance values from the first plurality of pairings of the last distance block.

17. The program storage medium of claim 16, wherein each of the distance blocks other than an initial one of the distance blocks in the sequence include a number of sub-blocks equaling a maximum of a plurality of permitted values of the limited number of each selector block, each of the sub-blocks determining the distance value for each pairing of one candidate and the symbols in the constellation, and in response to the maximum exceeding the limited number of the distance block, the distance block puts into a low-power mode a number of the sub-blocks equaling a difference between the maximum number and the limited number.

18. The program storage medium of claim 16, wherein each of the distance blocks other than an initial one of the distance blocks in the sequence include a number of sub-blocks equaling a minimum of a plurality of permitted values of the limited number of each selector block, each of the sub-blocks determining the distance value for each pairing of one candidate and the symbols in the constellation, and in response to the minimum being exceeded by the limited number of the distance block, the distance block time-multiplexes the determining of the distances values by the sub-blocks.

19. The program storage medium of claim 16, wherein the limit block includes a plurality of power ranges each having an associated integer provided as the limited number to the respective selector block coupled between the successive first and second distance blocks in response to the power range encompassing a total power received from the transmitting antenna associated with the first distance block.

20. The program storage medium of claim 16, wherein the identifier block selects the pairing and the pairing recursively includes, for each transmitting antenna, a respective one of the symbols that is detected as transmitted from the transmitting antenna.

* * * * *